United States Patent [19]

Vesley et al.

[11] Patent Number: 4,950,537

[45] Date of Patent: Aug. 21, 1990

[54] COLORED FOAMLIKE PRESSURE-SENSITIVE ADHESIVE TAPE

[75] Inventors: George F. Vesley, Hudson, Wis.; Patrick G. Zimmerman, St. Paul, Minn.

[73] Assignee: Minnesota Mining and Manufacturing Company, St. Paul, Minn.

[21] Appl. No.: 314,479

[22] Filed: Feb. 22, 1989

Related U.S. Application Data

[63] Continuation-in-part of Ser. No. 143,461, Jan. 13, 1988, abandoned.

[51] Int. Cl.$^5$ .................. B32B 3/10; B32B 27/30; B32B 27/14
[52] U.S. Cl. .................. 428/345; 428/343; 428/354; 428/355
[58] Field of Search .............. 428/345, 343, 354, 355

[56] References Cited

U.S. PATENT DOCUMENTS

| | | | |
|---|---|---|---|
| 2,956,904 | 10/1960 | Hendricks | 117/93 |
| 3,365,315 | 1/1968 | Beck et al. | 106/40 |
| 3,615,972 | 10/1971 | Morehouse et al. | 156/79 |
| 4,075,238 | 2/1978 | Mark et al. | 260/458 C |
| 4,181,752 | 1/1980 | Martens et al. | 427/54.1 |
| 4,223,067 | 9/1980 | Levens | 428/308 |
| 4,243,500 | 1/1981 | Glennon | 204/159.12 |
| 4,287,308 | 9/1981 | Nakayama et al. | 521/53 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,391,646 | 7/1983 | Howell | 106/97 |
| 4,513,039 | 4/1985 | Esmay | 428/345 X |
| 4,612,242 | 9/1986 | Vesley et al. | 428/313.9 |
| 4,618,525 | 10/1986 | Chamberlain et al. | 428/209 |
| 4,666,771 | 5/1987 | Vesley et al. | 428/325 |
| 4,699,816 | 10/1987 | Galli | 428/345 X |
| 4,710,536 | 12/1987 | Klingen et al. | 524/493 |
| 4,749,590 | 6/1988 | Klingen et al. | 427/54.1 |
| 4,780,491 | 10/1988 | Vesley et al. | 523/219 |
| 4,818,610 | 4/1989 | Zimmerman et al. | 428/345 |

OTHER PUBLICATIONS

JP49-73420 Production of Colored, Hollow Micro-Spheres, Nov. 19, 1982, Patent Kokai (Laid Open) Publication.

JP57-188435 Method for Producing Architectural and Construction Materials, Jul. 16, 1974 Patent Kokai (Laid Open) Publication.

*Primary Examiner*—George F. Lesmes
*Assistant Examiner*—J. Davis
*Attorney, Agent, or Firm*—Donald M. Sell; Walter N. Kirn; Darla P. Neaveill

[57] ABSTRACT

The invention relates to a foamlike pressure-sensitive adhesive tape comprising a flexible carrier supporting one or more pressure-sensitive adhesive layers, at least one layer of the pressure-sensitive adhesive having pigment-coated microbubbles dispersed therein having an average diameter from 5 to 200 micrometers, wherein the coat comprises pigment particle aggregates having an average pigment aggregate size being from about 0.5 microns to about 5 microns.

The invention further relates to pigment-coated microbubbles, and to a method for making coated microbubbles involving rolling the pigment and the microbubbles in a cylindrical container with two or more mixing rods having lengths at least about equal to the interior diameter of the container, and a combined surface area at least about 5% of the interior surface area of the container.

9 Claims, No Drawings

COLORED FOAMLIKE PRESSURE-SENSITIVE ADHESIVE TAPE

BACKGROUND OF THE INVENTION

This application is a continuation-in-part of U.S. Ser. No. 143,461, filed Jan. 13, 1988, now abandoned.

FIELD OF THE INVENTION

The invention concerns pressure-sensitive adhesive tape which has a pressure-sensitive adhesive layer containing pigment-coated microbubbles. The adhesive preferably comprises a copolymer of an acrylic acid ester of nontertiary alcohol and a copolymerizable monomer having a polar group such as acrylic acid.

DESCRIPTION OF THE RELATED ART

Foam-backed pressure-sensitive adhesive tape is commonly used to adhere an article to a substrate, e.g., sealing a skylight or attaching body-side moldings to automotive vehicles or simulated mullion bars to glass windows The foam backings of such tapes often are pigmented with carbon black to afford a dark appearance that camouflages their presence. The pressure-sensitive adhesive tape of U.S. 4,223,067 (Levens), has a foamlike appearance and character, even though it is not a foam, and is useful for purposes previously requiring a foam-backed pressure-sensitive adhesive tape.

A foamlike tape of the Levens patent may be made by ultraviolet polymerization of a layer of an adhesive-forming mixture containing colorless glass microbubbles which, due to multiple reflections of light at the surfaces of the microbubbles, act as a white pigment, thus making the tape undesirably conspicuous in uses such as those described above.

Because of its superior performance characteristics, the foamlike tape of the Levens patent is often preferred to foam-backed tapes for such purposes and would be more acceptable if its adhesive layer were colored to blend with the color of objects to which it will be adhered. If carbon black or other pigment were added to the photopolymerizable adhesive-forming mixture in amounts producing sufficient blackness to blend with dark objects, this would block the ultraviolet radiation from polymerizing the mixture to a pressure-sensitive state. Up to about 0.1 or 0.15 percent by weight of carbon black can be employed without undue interference with the polymerization of a 50-micrometer layer, but such small amounts produce only a gray color.

Although the microbubbles of the examples of the Levens patent are glass, they can also be polymeric of the type described in U.S. Pat. No. 3,615,972 (Morehouse et al.) or U.S. Pat. No. 4,287,308 (Nakayama et al.).

U.S. Pat. Nos. 4,612,242 (Vesley et al.) and No. 4,618,525 (Chamberlain et al.) teach that by applying an inorganic, thin-film coating to the glass microbubbles, the tape of the aforementioned Levens patent can have a sufficiently dark appearance to be camouflaged. The Chamberlain patent also teaches that glass microbubbles having inorganic thin-film coatings can be used as fillers in other matrices to provide coherent articles other than tapes, thus affording good hiding power while also imparting aesthetically pleasing colors to normally transparent articles However, the tapes of these references do have disadvantages in that the thin-film microbubbles involve complex processing equipment and conditions and are very expensive. Further, the variety of possible colors is limited as is the intensity of colors obtained from film-coated microbubbles alone. Somewhat deeper colors can be obtained by admixing additional pigment into the monomer matrix However, this is generally accompanied by loss of adhesive properties due to reduced effectiveness of the photopolymerization of such a tape.

U.S. Pat. No. 4,666,771 (Vesley et al.) teaches that by forming glass microbubbles of stained glass, the tape of the Levens patent can be colored and, when a pigment or dye is dispersed throughout the adhesive layer, the tape can be sufficiently darkened in appearance to be camouflaged. Stained glass microbubbles are highly pleasing aesthetically, however, processing of such bubbles is both difficult and expensive.

U.S. Pat. No. 4,181,752, (Martens et al.) discloses a process for making pressure-sensitive adhesive tape which involves the photopolymerization of the alkyl esters of acrylic acid and the modifying monomers to form the acrylate copolymers. It is also disclosed that the intensity and spectral distribution of the irradiation must be controlled in order to attain desirably high peel resistance and cohesive strength. The process disclosed is preferably carried out in the absence of oxygen and air which inhibit the polymerization reaction. Thus, it is normally carried out in an inert atmosphere such as nitrogen, carbon dioxide, helium, argon, etc. Air can also be excluded by sandwiching the liquid photopolymerizable mixture between layers of solid sheet material and irradiating through the sheet material.

SUMMARY OF THE INVENTION

The foamlike pressure-sensitive adhesive tapes of the invention are equivalent in performance to the white foamlike tapes of the above-cited Levens patent. Tapes of the invention present a sufficiently dark or colored appearance to meet the needs mentioned above, and may be produced more easily and economically than dark tapes of the above cited references.

As compared to coated microbubbles of the above-cited Vesley and Chamberlain patents, microbubbles of the invention have much thicker coatings without unduly inhibiting the photopolymerization of the tapes. The thin film coatings of Vesley and Chamberlain are disclosed to be less than 30 nanometers in thickness, preferably less than 10 nm. Applicants microbubbles have pigment coatings comprising aggregates of particles having an average particle aggregate size of about 0.5 microns to about 5 microns. As a result, Applicants' tapes can have more intense color, e.g., more intense blackness without loss of adhesive or cohesive properties. Also, the foamlike tapes of the invention can have any desired color as opposed to tapes of the Vesley and Chamberlain patents being limited to such colors as can be provided by available thin-film coatings and by stained glasses capable of being formed into microbubbles.

Further, the tapes of the present invention may contained colored polymeric microbubbles. The tapes of the Vesley and Chamberlain patents are limited to the use of glass microbubbles, as the processing generates heat which would deform or destroy polymeric microbubbles.

The present invention provides foamlike pressure-sensitive adhesive tapes comprising a flexible carrier supporting one or more pressure-sensitive adhesive layers, at least one layer of the pressure-sensitive adhesive comprising from about 5 to about 65 volume percent pigment-coated microbubbles dispersed therein, the microbubbles having an average diameter from 5 to 200 micrometers, wherein the pigment coat comprises pigment particle aggregates, the average aggregate size being from about 0.5 microns to about 5 microns.

The invention further provides a method for making pigment-coated microbubbles comprising the steps of:
  (a) placing into a hollow cylindrical container
    (1) uncoated microbubbles selected from the group consisting of polymeric and glass microbubbles and mixtures thereof,
    (2) an effective amount of pigment, and
    (3) at least two mixing rods, each of the rods having a length at least about equal to the interior diameter of the container, the rods having a combined surface area at least about 5% of the interior surface area of the container, and
  (b) rolling the container for a period of from about 3 minutes to about 15 minutes.

The invention further provides colored polymeric microbubbles, polymeric and glass microbubbles made by the above process, and tapes made therewith.

As used herein, the word "pigment" includes particulate pigments, dyes, and coloring agents comprising other colorants as well as mixtures thereof.

As used herein, the term "aggregate" means two or more pigment particles in an intimate association.

DETAILED DESCRIPTION OF THE INVENTION

The foamlike pressure-sensitive adhesive tape of the invention comprises pigment-coated microbubbles. To provide an intense color, the pigment is coated in pigment particle aggregates, the average aggregate size being from about 0.5 microns to about 5 microns. Stated another way, the average aggregate size ranges from about 1/10 to about 1/100 that of the average diameter of the microbubble. Useful coating weights vary with the pigment used, i.e., dependent on the wavelength at which the pigment absorbs light. When microbubbles are coated with carbon black or another pigment opaque to radiation between the wavelengths of 300 and 400 nm, the maximum possible average coating weight will be lower than the maximum average coating weight for e.g., a light tan or yellow pigment. The average coating weight does not include the weight of radiation-transparent non-pigment coatings, such as a binder or protective coating. Such coating may be sprayed onto the microbubbles prior to pigment coating or afterwards. The microbubbles may be glass or polymeric microbubbles, or a mixture thereof.

The novel foamlike pressure-sensitive adhesive tape, like that of the Levens patent, may be produced by photopolymerizing the microbubble-containing adhesive. However, the foamlike layer of the novel tape can have much more intense color, e.g., blackness, than could be achieved by photopolymerization using uncoated microbubbles in admixture with pigments. If carbon black or other pigment were added to the photopolymerizable adhesive-forming mixture in amounts producing sufficient blackness to blend with dark objects, i.e., L* value of 30 or less, this would block the ultraviolet radiation from polymerizing the mixture to a pressure-sensitive state. The percentage of carbon black that can be employed without undue interference with the polymerization produces only a gray color, i.e., L* of about 35. Surprisingly, complete photopoly-merization of the adhesive layer of the novel tape within a reasonably short period of time is possible with pigment-coated microbubbles, yielding much darker colors.

When microbubbles are coated with carbon black or another pigment opaque to radiation between 300 and 400 nm, such pigment may comprise up to about 20% of the weight of the microbubbles. If substantially higher coating weights of such opaque pigments are employed, the pressure-sensitive adhesive might not become fully cured. Pigments which are partially transparent to such radiation may be used in larger amounts.

The pigment-coated microbubbles afford excellent hiding power to the novel foamlike tape, surprisingly so in view of the fact that their presence does not unduly inhibit photopolymerization. Even though a foamlike adhesive layer as thin as 0.1 mm has excellent hiding power, a much thicker layer, i.e., having a thickness of 0.5 mm can still be photopolymerized through its full thickness from a bank of lamps on only one side. This is especially surprising as thick tapes having an equally effective amount of pigment distributed in the polymer matrix cannot be so cured; in fact, such a tape may not cure when irradiating from both sides. By irradiating from both sides, it should be possible to produce foamlike adhesive layers of the invention as thick as 2.5 mm or more. When the pigment is carbon black and is present at from 0.5% to 10% by weight of the microbubbles, the foamlike adhesive layer has a black color which provides satisfactory camouflage for the adhesive in uses mentioned above.

Under microscopic examination of the pigment-coated microbubbles, the coats appear less intense. They may also appear somewhat grainy or splotchy, i.e., individual aggregates are visible even though an adhesive layer containing the pigment-coated microbubbles appears to the naked eye to have a uniform coloring.

The average diameter of the pigment-coated microbubbles should be from 5 to 200 micrometers, preferably between 20 to 80 micrometers. The pigment-coated microbubbles of the invention should have an average density not exceeding 1.0 g/cm$^3$, preferably less than 0.4 g/cm$^3$, and most preferably less than 0.2 g/cm$^3$. Such density is determined using a Beckman pycnometer to determine the density, thus compensating for bulk distribution characteristics, as described in The American Society of Test Methods, Test No. ASTM D-2840-69.

The microbubbles may comprise up to 65 volume percent of the pressure-sensitive adhesive layer of the novel foamlike tape. It would be unduly difficult to make a coherent and uniform pressure-sensitive adhesive layer at more than 65 volume percent, whereas the advantages from using microbubbles may not be significantly realized at less than 5 volume percent. Preferably from 10 to 55 volume percent of the pressure-sensitive adhesive layer comprises microbubbles.

Useful uncoated glass microbubbles include those disclosed in U.S. Pat. Nos. 3,365,315 (Beck et al.), 4,391,646, (Howell), and 4,223,067 (Levens). These microbubbles may be pigment coated according to the method of the invention. Other types of colored microbubbles such as those described in U.S. Pat. Nos. 4,612,242, 4,780,491, and 4,666,771 (Vesley et al.), all of which are incorporated herein by reference, may be used in conjunction with pigment-coated microbubbles of the invention so long as the total amount of microbubbles does not exceed 65 volume percent. Pigment-coated glass microbubbles are commercially available from such suppliers as Rose Labs, Atlanta, Ga.; however, such bubbles typically have such high coating weights as to prohibit photopolymerization when used in tapes of the invention.

Useful uncoated hollow polymeric microbubbles include those described in U.S. Pat. Nos. 3,615,972, 4,075,238, and 4,287,308, incorporated herein by reference. These microbubbles may be pigment coated by the method of the invention. The microbubbles are available from Kema Nord Plastics under the trade name "Expancel" and from Matsumoto Yushi Seiyaku under the trade name "Micropearl". In expanded form, the microbubbles have a specific density of approximately 0.02–0.036 g/cc. It is possible to include the unexpanded microspheres in the core layer and subsequently heat them to cause expansion, but it is generally preferred to mix in the expanded microspheres. This makes it easier to ensure that the hollow microbubbles in the final adhesive are substantially surrounded by at least a thin layer of adhesive.

Various methods exist for coating microbubbles; however, most techniques have significant disadvantages. Some techniques which would sufficiently distribute the pigment onto the surface of the microbubbles and result in adherence thereto, e.g., agitating the microbubbles with adequate amounts of pigment using milling spheres to distribute the pigment, have typically resulted in excessive damage to the microbubbles, including large amounts of breakage when glass microbubbles have been used. Methods causing lower amounts of damage, e.g., shaking or rolling microbubbles in the presence of pigment have typically resulted in inefficient distribution of the pigment onto the microbubbles or insufficient adherence of the pigment to the surface of the microbubbles. When tapes are made using such lightly coated microbubbles little if any improvement in color intensity is seen over tapes made with pigment merely admixed into the monomer matrix. Other techniques require considerable specialized processing and handling equipment.

Applicants have now discovered a method for making pigment-coated microbubbles which is efficient, inexpensive and causes minimal damage, even to thin-walled glass microbubbles.

Such method for making pigment-coated microbubbles comprises the steps of:

(a) placing into a hollow cylindrical container
  (1) uncoated microbubbles selected from the group consisting of glass and polymeric microbubbles, and mixtures thereof,
  (2) an effective amount of pigment, and
  (3) at least two mixing rods, each of the rods having a length at least about equal to the interior diameter of the container, the rods having a combined surface area at least about 5% of the interior surface area of the container, and
(b) rolling the container for a period of from about 3 minutes to about 15 minutes.

Surprisingly, this simple procedure results in efficient distribution of the pigment onto the microbubbles, and adherence thereto with minimal damage to the microbubbles.

The role of the mixing rods is critical to the efficiency of the process; when a similar method is used which omits the use of mixing rods, the resulting pigment-coated microbubbles are much less intense in color than pigment-coated microbubbles made via the method of the invention. Further, the substitution of mixing spheres or other common milling devices for the mixing rods results in a significant increase in breakage of glass microbubbles, and damage to polymeric microbubbles. The method may also involve precoating the microbubbles with an organic binder in order to make the surface retain higher percentages of the pigment. Likewise, the microbubbles may be post-treated with protective coating, so long as the pigment-coating is not significantly disturbed.

The mixing rods preferably have a non-porous surface, and may be glass, ceramic or metal, e.g., aluminum, brass or stainless steel. The rods should have a length which is approximately equal to the interior diameter of the container, maximizing the surface contact of the rods with the microbubbles while minimizing any turbulent flow. Further, the rods should have a combined surface area of at least 5% of the interior surface area of the container, preferably at least about 7%, more preferably at least about 9% in order to more effectively distribute the pigment. The pigment is added to the uncoated microbubbles in a particulate form, rather than as a suspension or dispersion.

The rolling time should be at least about 3 minutes, and preferably about 5 minutes. However, the rolling time may vary dependent on such factors as the speed of the rolling, the quantity of bubbles, and their resistance to breakage, the color intensity desired, and the size of the container.

Pigment-coated microbubbles made by other methods which result in efficient distribution of the pigment onto the microbubbles and adherence thereto are also useful in tapes of the invention. Other methods include, but are not limited to, spraying a solvent dispersion or aqueous suspension containing a particulate pigment onto the microbubbles, and then drying.

The acrylic pressure-sensitive adhesives useful in the present invention are alkyl acrylates, preferably monofunctional unsaturated acrylate esters of non-tertiary alkyl alcohols, the molecules of which have from 1 to about 14 carbon atoms. Included within this class of monomers are, for example, isooctyl acrylate, isononyl acrylate, 2-ethyl-hexyl acrylate, decyl acrylate, dodecyl acrylate, n-butyl acrylate, and hexyl acrylate. Preferred monomers include isooctyl acrylate, isononyl acrylate, and butyl acrylate. The alkyl acrylate monomers may be used to form homopolymers for the photopolymerizable polymer or they may be copolymerized with polar monomers. When copolymerized with strongly polar monomers, the alkyl acrylate monomer generally comprises at least about 75% of the photopolymerizable polymers. When copolymerized with moderately polar monomers, the alkyl acrylate monomer generally comprises at least about 70% of the photopolymerizable polymer.

The polar copolymerizable monomers may be selected from strongly polar monomers such as acrylic acid, itaconic acid, hydroxyalkyl acrylates, cyanoalkyl acrylates, acrylamides or substituted acrylamides, or from moderately polar monomers such as N-vinyl pyrrolidone, N-vinyl caprolactam, acrylonitrile, vinyl chloride or diallyl phthalate. The strongly polar copolymerizable monomer preferably comprises up to about 25%, more preferably up to about 15%. The moderately polar copolymerizable monomer preferably comprises up to about 50%, more preferably from 5% to about 30% of the photopolymerizable polymer.

Among pressure-sensitive adhesives which are useful for the pressure-sensitive adhesive layer of the novel tape are those which become tacky only at elevated temperatures, e.g., acrylic copolymers having average carbon-to-carbon chains of less than 4 carbon atoms or those comprising a polymer wherein methacrylic acid esters are substituted for portions of acrylic acid esters.

Where superior cohesive strengths are desired, the pressure-sensitive adhesive matrix of the novel tape should be crosslinked. Preferred crosslinking agents for an acrylic pressure-sensitive adhesive are multifunctional acrylates such as 1,6-hexanedioldiacrylate as well as those disclosed in U.S. Pat. No. 4,379,201 (Heilmann et al.), incorporated herein by reference. Crosslinking is especially easy to control when photopolymerizing the monomer in admixture with a multifunctional acrylate crosslinking agent. Other types of crosslinking agents are also useful, e.g., any of those taught in U.S. Pat. Nos. 4,330,590 (Vesley), and 4,329,384 (Vesley et al.), both of which are incorporated by reference. Heat-activatable crosslinking agents such as a lower-alkoxylated amino formaldehyde condensate having $C_{1-4}$ alkyl groups, for example, hexamethoxymethyl melamine (available as Cymel TM 303 from American Cyanimid Co.) or tetramethoxymethyl urea (available as Beetle TM 65 from American Cyanimid Co.) or tetrabutoxymethyl urea (Beetle TM 85) are also useful. Each of the crosslinking agents is useful in the range of from about 0.01% to about 1% of the total weight of the monomers.

Tapes of the invention may comprise more than one foamlike pressure-sensitive adhesive layer. In such tapes, the foamlike pressure-sensitive adhesive layers may comprise similar or dissimilar adhesives, in like or unlike thicknesses, having similar or different additives. At least one layer of the pressure-sensitive adhesive comprises pigment-coated microbubbles; additional layers may comprise additional pigment-coated microbubbles, coated with similar or differing pigments, or uncoated microbubbles.

Where a tape of the invention is to be adhered to surface to which its pressure-sensitive adhesive layer would not form a strong bond, it may be desirable to apply to one or both faces of its pigment-coated microbubble-filled adhesive layer, a layer of microbubble-free pressure-sensitive adhesive which is specially selected for its adhesion to that surface.

Where photopolymerization is desirable, the pressure-sensitive adhesive matrix of the novel tape of the invention may also contain a photoinitiator to aid in polymerization of the monomers. Photoinitiators that are useful for polymerizing the acrylate monomer include the benzoin ethers, substituted benzoin ethers such as benzoin methyl ether or benzoin isopropyl ether, substituted acetophenones such as 2,2-diethoxy-acetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(0-ethoxycarbonyl) oxime. Generally, the photoinitiator is present in an amount of from about 0.01 part to about 1.0 parts per 100 parts monomer weight (phr).

In situ polymerization can also be effected by thermal polymerization or by electron beam as taught in U.S. Pat. No. 4,243,500 (Glennon), and U.S. Pat. No. 2,956,904 (Hendricks), however, photopolymerization by ultraviolet radiation is generally preferred.

Other useful materials which can be blended into the pressure-sensitive adhesive include plasticizers, tackifiers, fibrous reinforcing agents, woven and nonwoven fabrics, foaming agents, fire retardants and viscosity adjusting agents.

An especially useful filler material is hydrophobic silica as disclosed in U.S. Pat. Nos. 4,710,536 and 4,749,590, (Klingen, Zimmerman), incorporated herein by reference. In one preferred embodiment of the present invention, the pressure-sensitive adhesive layer further comprises from about 2 to about 15 phr of a hydrophobic silica having a surface area of at least 10 $m^2/g$.

The coatable compositions used in tapes of the invention, especially the pressure-sensitive compositions, are preferably prepared by premixing together the photopolymerizable monomers and the polar copolymerizable monomer, if used, and photoinitiator. This premix is then partially polymerized to a viscosity in the range of from about 500 cps to about 5,000 cps to achieve a coatable syrup. Alternatively, the monomers may be mixed with a thixotropic agent such as fumed silica to achieve a coatable syrup composition.

Photopolymerization is preferably carried out in an inert atmosphere, such as nitrogen. An inert atmosphere may also be achieved by temporarily covering the photopolymerizable coating with a plastic film which is transparent to ultraviolet radiation, and irradiating through the film in air. If the photopolymerizable coating is not covered during photopolymerization, the permissible oxygen content of the inert atmosphere may be increased by mixing the coating with a combustible tin compound as taught in U.S. 4,303,485 (Levens), which also teaches such technique for making thick coatings in air.

The adhesive composition may be coated onto a backing or substrate prior to polymerization. This may be accomplished using any conventional means such as roller coating, dip coating or extrusion coating.

As used herein, the term "tape" includes but is not limited to, those adhesive strips which are single-coated adhesive layers permanently attached to a backing or support, double-coated adhesive strips having flexible supports with an adhesive layer on both sides thereof, and adhesive being with no support or backing, such being typical releasably attached to a low-adhesion liner, and commonly called "transfer tapes".

Where multilayer tape constructions are desirable, a preferred method of construction is multilayer coating, as described in U.S. Ser. No. 84,781, (Zimmerman et al.), incorporated herein by reference, wherein a plurality of copolymerizable coatable compositions is prepared, each composition containing at least one photopolymerizable monomer, one of the coatable composition being the novel pressure-sensitive adhesive of the invention. The coatable compositions are coated to provide a plurality of superimposed layers with contiguous layers defining an interface therebetween, with the novel pressure-sensitive adhesive terpolymer of the invention being coated as a first or last layer. Migration of photopolymerizable monomers through the interface between contiguous layers is permitted, and the superimposed layers are then simultaneously irradiated. This provides polymeric chains comprised of copolymers of photopolymerizable monomers originating from contiguous layers extending through the interface therebetween, thereby producing a tape having layers which cannot be delaminated.

The following tests may be used to evaluate tapes of the invention.

Test Methods

Static Shear Value at 70° C.

Two flat, rigid stainless steel plates are bonded together by a piece of an adhesive layer 1.27 cm × 2.5 cm square. Before testing, a 1000-g weight rests over the bonded area for 15 minutes. Then the bonded plates are placed in an air-circulating oven which has been preheated to 70° C., and after 15 minutes, a 500-g weight is hung from one of the plates while the other plate is held in a position tilted 2° from the vertical to insure against any peel forces. The time at which the weight falls is the "Static Shear Value at 70° C." If no failure, the test is discontinued at 10,000 minutes. Only cohesive failures are reported.

T-Peel

T-peel is measured as in ASTM D-1876-72 except that the test tapes are 1.27 cm (0.5 inch) in width and are tested only two hours after being adhered to aluminum backings. Results are reported in Newtons per decimeter (N/dm) Only cohesive failures are reported.

180° Peel

The adhesive layer to be tested is transferred onto 0.05-mm thick, chemically primed, aluminum foil which then is slit to a width of 1.27 cm (½ inch). The resulting tape is self-adhered to a smooth stainless steel plate under the weight of a 2.04 kg hard-rubber-covered steel roller, 2 passes in each direction. After dwelling at 23° C. for one hour, "180° Peel" is measured by moving the free end of the tape away from the steel plate at a rate of about 0.5 cm per second using a tensile tester.

90° Peel

The adhesive layer to be tested is transferred onto a 0.05-mm thick soft aluminum foil which then is slit to a width of 1.27 cm (½ inch). The resulting tape is self-adhered to a smooth stainless steel plate under the weight of a 5.5-kg hard-rubber-covered steel roller, one pass in each direction. After dwelling at 23° C. for 20 minutes, the "90° Peel" is measured by moving the free end of the tape away from the steel plate at 90° and at a rate of about 0.5 cm per second using a tensile tester.

Darkness

The darkness of a pressure-sensitive adhesive layer is determined on a Hunter LabScan Spectrocolorimeter using a 10 degree reflectance, Illum=D65 and the CIE lab scale (L* a* b*) where L*=0 is black and L*=100 is white. Since a* and b* for black samples are usually between −5 and +5, they are not reported unless one of them is outside of that range.

Pigments Pigments used in making foamlike pressure-sensitive adhesive tapes of the invention include

| Pigment | |
| --- | --- |
| Red | segnale red FGR |
| Blue | phthalocyanine blue |
| Yellow | chrome yellow |
| Black-1 | "Raven" 1500 carbon black (Columbia Chemicals) |
| Black-2 | "Raven" 1040 carbon black |
| Black-3 | "Raven" H2O carbon black |

-continued

| Pigment | |
| --- | --- |
| Black-4 | lampblack |

PIGMENT-COATED MICROBUBBLES A-H

These pigment-coated microbubbles were experimental microbubbles, ordered from Rose Labs with the pigment and coating weight specified. They were coated, it is believed, using an organic binder, onto glass microbubbles having an average density of 0.15 g/cm$^3$ and 20–200 micrometers in diameter (average 55 micrometers) except that the glass microbubbles onto which the blue pigment was coated had an average density of 0.23g/cm$^3$. Reported in Table I are calculations of the percentage of the pigment-coated microbubbles that comprise pigment.

TABLE I

| Pigment coated-Microbubbles | Pigment | % Pigment (by weight) | Average density** (g/cm$^3$) |
| --- | --- | --- | --- |
| A | Red | 3.6 | 0.15 |
| B | Blue | 21 | 0.29 |
| C | Yellow | 51 | 0.27 |
| D | Black-1 | * | 0.17 |
| E | Black-1 | * | 0.16 |
| F | Black-4 | * | 0.20 |
| G | Black-1 | * | 0.15 |
| H | Black-4 | * | 0.14 |

*It was found to be impossible to determine the % pigment of Pigment-coated Microbubbles D-H, but it is believed that the pigment loading of Pigment-Coated Microbubbles D was about five times that of each of Pigment-Coated Microbubbles E and F, and about 20 times that of each of Pigment-Coated Microbubbles G and H.
**Average density of pigment-coated microbubbles after removing a high-density fraction in order to eliminate any microbubbles that may have been broken and any malformed glass microbubbles.

PIGMENT-COATED MICROBUBBLES I

Pigment-Coated Microbubbles I were coated by loading 8g of the above-described glass microbubbles and 0.04 g of pigment into a glass jar (1 quart; about 1 liter) which was closed and placed on a shaker for 5 minutes. The microbubbles took on the color of the pigment, and microscopic examination showed that each microbubble had become coated. The average density was unchanged. No further improvement in coating density or color intensity was observed with continued shaking for up to thirty minutes. The pigment particle aggregates on the surface of the microbubbles ranged from about 0.5 microns in size to about 5 microns in size.

Pigment-Coated Microbubbles J-Q

Pigment-Coated Microbubbles J-Q were coated at varied pigment loadings in a glass jar as in the preceding paragraph, but the glass jar contained three aluminum rods, each 1.27 cm in diameter and 10 cm in length. Instead of using a shaker, the glass jar (after being wrapped with protective tape) was rolled at 120 rpm for 5 minutes. The microbubbles received a coating which was noticeably darker than the coating obtained by shaking. The density of the Pigment-Coated Microbubbles J-Q increased slightly as indicated in Table II, the increase being attributable to some breakage of microbubbles. When the rolling time was increased to 30 minutes, the density was about 0.3g/cm$^3$, indicating substantial breakage, and the pigment-coated microbubbles had a deeper color, but these microbubbles were not used in testing.

Pigment-Coated Microbubbles R-S

Pigment-Coated Microbubbles R were made in the same way as Pigment-Coated Microbubbles I except using polymeric microbubbles ("Expancel" 551DE) having density of 0.036 g/cm³ and a diameter of 5-100 micrometers.

Pigment-Coated Microbubbles S were made in the same way as Pigment-Coated Microbubbles J-Q except using the polymeric microbubbles.

TABLE II

| Pigment coated-Microbubbles | Pigment | Ratio of pigment to glass (by weight) | Average density (g/cm³) |
|---|---|---|---|
| I | Black-2 | 0.5 | 0.16 |
| J | Black-2 | 0.5 | 0.19 |
| K | Black-2 | 0.75 | 0.19 |
| L | Black-2 | 1.0 | 0.18 |
| M | Black-3 | 0.5 | 0.18 |
| N | Black-1 | 0.5 | 0.19 |
| O | Red | 0.5 | 0.19 |
| P | Blue | 0.5 | 0.19 |
| Q | Yellow | 0.5 | 0.20 |
| R | Black-2 | 0.19 | 0.037 |
| S | Black-2 | 0.14 | 0.037 |

The following examples are for illustrative purposes only, and should not be construed as limiting the invention. All percents, parts and ratios listed are by weight unless otherwise specified.

EXAMPLES

To make each of the foamlike pressure-sensitive adhesive tapes of Examples 1-13, a syrup of coatable viscosity was prepared by partially polymerizing, as taught in U.S. Pat. No. 4,330,590 (Vesley), a mixture of 87.5 parts isooctyl acrylate, 12.5 parts acrylic acid, and 0.04 part of 2,2-dimethyl-2-phenyl acetophenone ("Irgacure" 651). An additional 0.1 part of "Irgacure" 651 was added to each aliquot of this syrup as well as 0.05 part of hexanedioldiacrylate, and 7 parts of pigment-coated glass microbubbles (1.8 parts when the microbubbles were polymeric). Each of the resulting mixtures was thoroughly mixed slowly with an air stirrer and carefully degassed in a dissector using a vacuum pump. The pigment-coated glass microbubbles comprised about 33% by volume of each mixture.

Each mixture was fed into the nip of a knife coater between a pair of transparent, biaxially-oriented poly(ethylene terephthalate) films, the facing surfaces of which had low-adhesion coating. The knife coater was adjusted to provide a coating thickness of approximately 0.625 mm for the tapes of Examples 1-4 and a thickness of approximately 1.0 mm for Examples 5-13. The composite emerging from the knife coater was irradiated simultaneously from both sides with a bank of lamps, 90% of the emissions of which were between 300 and 400 nm with a maximum at 351 nm. Each side of the coating was exposed to a total radiation of 400-410 millijoules as measured by a Dynachem radiometer Model 500 which is spectrally responsive between 300 and 400 nm, maximum 350 nm. This total was corrected for the irradiation adsorbed by the poly(ethylene terephthalate) films. The composite was cooled by blowing air against both films during the irradiation to keep the temperature of the film below 85° C. to avoid wrinkling of the films. Each of the foamlike pressure-sensitive adhesive tapes of Examples 1-13 had a density of about 720g/m³.

The tapes of Examples 1-13 incorporated pigment-coated microbubbles as reported in Tables III and IV. In some of the tapes of Table IV, a portion of the 7 parts of pigment-coated microbubbles had been replaced with the indicated parts of uncoated microbubbles.

TABLE III

| Ex. | Pigment-coated Microbubbles | L* | a* | b* | T-peel (N/dm) | 180° Peel (Ndm) |
|---|---|---|---|---|---|---|
| 1 | A | 49 | 61 | 42 | 270 | 150 |
| 2 | B | 74 | 27 | 96 | 260 | 160 |
| 3 | C | 18 | 2 | −25 | 210 | 140 |
| 4 | G | 27 |  |  | 300 | 150 |
| Control** |  | 93 |  |  | 300 | 150 |

**Control tape made using uncoated glass microbubbles.

TABLE IV

| Ex. | Pigment-coated Microbubbles | Uncoated Microbubbles (parts) | L* | a* | b* | T-peel (N/dm) | 180° Peel (N/dm) |
|---|---|---|---|---|---|---|---|
| 5 | A |  | 45 | 61 | 38 | 310 | 150 |
| 6 | B |  | 19 | −2 | −23 | 290 | 150 |
| 7 | C |  | 33 | 93 | 40 | 310 | 110 |
| 8 | D |  | 16 |  |  | 300 | 200 |
| 9 | D | 3.5 | 29 |  |  | 340 | 170 |
| 10 | E | 1.6 | 17 |  |  | 350 | 110 |
| 11 | E | 2.1 | 22 |  |  | 330 | 130 |
| 12 | F |  | 15 |  |  | 310 | 120 |
| 13 | H | 1.4 | 26 |  |  | 320 | 140 |

Comparative Examples C1-C6

Tapes of Comparative Examples C1-C6 were made in the same way as the tapes of Examples 5-13, except that these tapes did not incorporate pigment-coated microbubbles; rather, the tapes incorporate a like volume of uncoated microbubbles. For each tape, the listed amount of pigment was added directly to each aliquot of syrup as a dispersion in phenoxyethyl acrylate (Penn Color). Each of the foamlike pressure-sensitive adhesive tapes of Comparative Examples C1-C6 had a density of about 720g/m³.

TABLE V

| Ex. | Pigment (phr) | L* | T-peel (N/dm) | 180° Peel (N/dm) |
|---|---|---|---|---|
| C1 | 0.034 | 48 | 350 | 149 |
| C2 | 0.06 | 38 | 324 | 182 |
| C3 | 0.07 | 36 | 324 | 158 |
| C4 | 0.08 | 31 | 280 | 173 |
| C5 | 0.10 | 28 | 252 | 182 |
| C6 | 0.12 | 26 | 219 | 142 |
| Control** | 0 | 94 | 372 | 153 |

**Control made without addition of pigment

As can be seen from the above data, tapes having pigment added directly to the syrup exhibit a reduction in adhesive properties as the amount of pigment is increased. This is due to reduced transmission of the ultraviolet radiation resulting from the darker color. Tapes of the invention do not exhibit a like reduction in properties at comparative darknesses (L* values). See, e.g., Examples 8-13.

EXAMPLES 14-24

Tapes of Examples 14-24 were made in the same way as the tapes of Examples 5-13, except that 2.0 parts of Degussa Aerosil ™ 972 were added. Test results are reported in Table VI. Each of the tapes of Examples 14-22 had a density of about 800-830 kg/m$^3$, and those of Examples 23-24 had a density of about 700 kg/m$^3$.

TABLE VI

| Ex. | Pigment-coated Microbubbles | L* | a* | b* | T-peel (N/dm) | 90° Peel (N/dm) |
|---|---|---|---|---|---|---|
| 14 | I | 55 | | | 370 | 310 |
| 15 | J | 38 | | | 370 | 270 |
| 16 | K | 31 | | | 350 | 300 |
| 17 | L | 29 | | | 340 | 320 |
| 18 | M | 52 | | | 360 | 340 |
| 19 | N | 63 | | | 380 | 230 |
| 20 | O | 86 | −3 | 40 | 360 | 270 |
| 21 | P | 64 | −27 | −30 | 370 | 230 |
| 22 | Q | 90 | −1 | 19 | 410 | 240 |
| 23 | R | 61 | | | 270 | 340 |
| 24 | S | 45 | | | | |

Each of the foamlike pressure-sensitive adhesive tapes of Examples 1-23 had a Static Shear Value at 70° C. of greater than 10,000 minutes.

What is claimed is:

1. A foamlike pressure-sensitive adhesive tape comprising a flexible carrier supporting one or more pressure-sensitive adhesive layers, at least one layer of said pressure-sensitive adhesive comprising from about 5 to about 65 volume percent pigment-coated microbubbles dispersed therein, said microbubbles having an average diameter from 5 to 200 micrometers, wherein said pigment coat comprises pigment particle aggregates with an average aggregate size being from about 0.5 microns to about 5 microns.

2. The foamlike pressure-sensitive adhesive tape of claim 1 wherein said pigment-coated microbubbles are glass.

3. Pressure-sensitive adhesive tape as defined in claim 1 wherein said pigment-coated microbubbles are polymeric.

4. Pressure-sensitive adhesive tape as defined in claim 1 wherein the average diameter of said pigment-coated microbubbles is from 20 to 80 micrometers.

5. Pressure-sensitive adhesive tape as defined in claim 1 wherein said pressure-sensitive adhesive layers comprise at least one copolymer of monomers comprising
    (a) acrylic acid ester of nontertiary alcohol, the molecules of which contain from 1 to about 14 carbon atoms, and
    (b) a polar copolymerizable monomer.

6. A pressure-sensitive adhesive tape according to claim 5 wherein at least a major proportion of said molecules contain from about 4 to about 12 carbon atoms.

7. A pressure-sensitive adhesive tape according to claim 5 wherein said pressure-sensitive adhesive further comprises a crosslinking agent.

8. A pressure-sensitive adhesive tape according to claim 1 wherein said pressure sensitive adhesive comprises
    (a) from about 85 parts to about 99 parts of isooctyl acrylate, and correspondingly, from about 1 to about 15 parts of a strongly polar copolymerizable monomer selected from the group consisting of acrylic acid, methacrylic acid, itaconic acid, acrylamide and methacrylamide, and
    (b) from about 0.01 part to about 1 part of a crosslinking agent selected from the group consisting of hexanedioldiacrylate, lower-alkoxylated amino formaldehyde condensates, and alkoxy substituted 2,4-bis(trichloromethyl)-s-triazines.

9. A pressure-sensitive adhesive tape according to claim 1 wherein said pressure-sensitive adhesive comprises
    (a) a polymer of 70-100 parts of substituted or unsubstituted acrylate monomer and correspondingly 30-0 parts of a moderately polar copolymerizable monomer selected from the group consisting of N-vinylpyrrolidone, N-vinylcaprolactam, vinyl chloride and acrylonitrile, and
    (b) from about 0.01 part to about 1 part of a crosslinking agent selected from the group consisting of hexandioldiacrylate, lower-alkoxylated amino formaldehyde condensates, and alkoxy substituted 2,4-bis(trichloromethyl)-s-triazines.

* * * * *

UNITED STATES PATENT AND TRADEMARK OFFICE
CERTIFICATE OF CORRECTION

PATENT NO. : 4,950,537

DATED : Aug. 21, 1990

INVENTOR(S) : George F. Vesley, Patrick G. Zimmerman

It is certified that error appears in the above-identified patent and that said Letters Patent is hereby corrected as shown below:

On the title page, in the ABSTRACT, line 6,
"wherein the coat comprises pigment particle aggregates having an average pigment aggregate size" should read -- wherein the pigment coat comprises pigment particle aggregates having an average aggregate size --

Column 1, Line 22, "windows The" insert period -- windows. The --

Column 1, Line 65, "articles However" insert period -- articles. However --

Column 2, Line 4, "matrix However" insert period -- matrix. However --

Column 2, Line 47, "Applicants microbubbles" insert possessive -- Applicants' microbubbles --

Column 2, Lines 59 and 60, "may contained colored" should read -- may contain colored --

Column 3, Line 68, "photopoly-merization" should read -- photopolymerization --

Column 4, Line 48, "Test Methods," delete comma, should read possessive -- Test Methods'--

Column 8, Line 45, "and adhesive being with" should read -- and adhesive strips with --

UNITED STATES PATENT AND TRADEMARK OFFICE
CERTIFICATE OF CORRECTION

PATENT NO. : 4,950,537

DATED : Aug. 21, 1990

INVENTOR(S) : George F. Vesley, Patrick G. Zimmerman

It is certified that error appears in the above-identified patent and that said Letters Patent is hereby corrected as shown below:

Column 9, Line 25, "(N/dm) Only" insert period -- (N/dm). Only --

Column 9, Line 58, "Pigments Pigments" should be changed so that "Pigments" is centered over the paragraph as in the previous paragraphs in the same column
--              Pigments Pigments used in making foamlike pressure-sensitive --

Column 9, Line 60, "include" should not be centered below the previous sentence and above the table, rather the sentence should be composed -- Pigments used in making foamlike pressure-sensitive adhesive tapes of the invention include --

Column 11, Line 33, "EXAMPLES" paragraph header should read -- EXAMPLES 1-13 --

Signed and Sealed this

Twenty-fifth Day of August, 1992

Attest:

DOUGLAS B. COMER

*Attesting Officer*      *Acting Commissioner of Patents and Trademarks*